July 9, 1940.  J. W. MYERS ET AL  2,207,634
CONTROL SYSTEM FOR ELECTRICAL HEATING UNITS
Filed Jan. 21, 1938  5 Sheets-Sheet 1
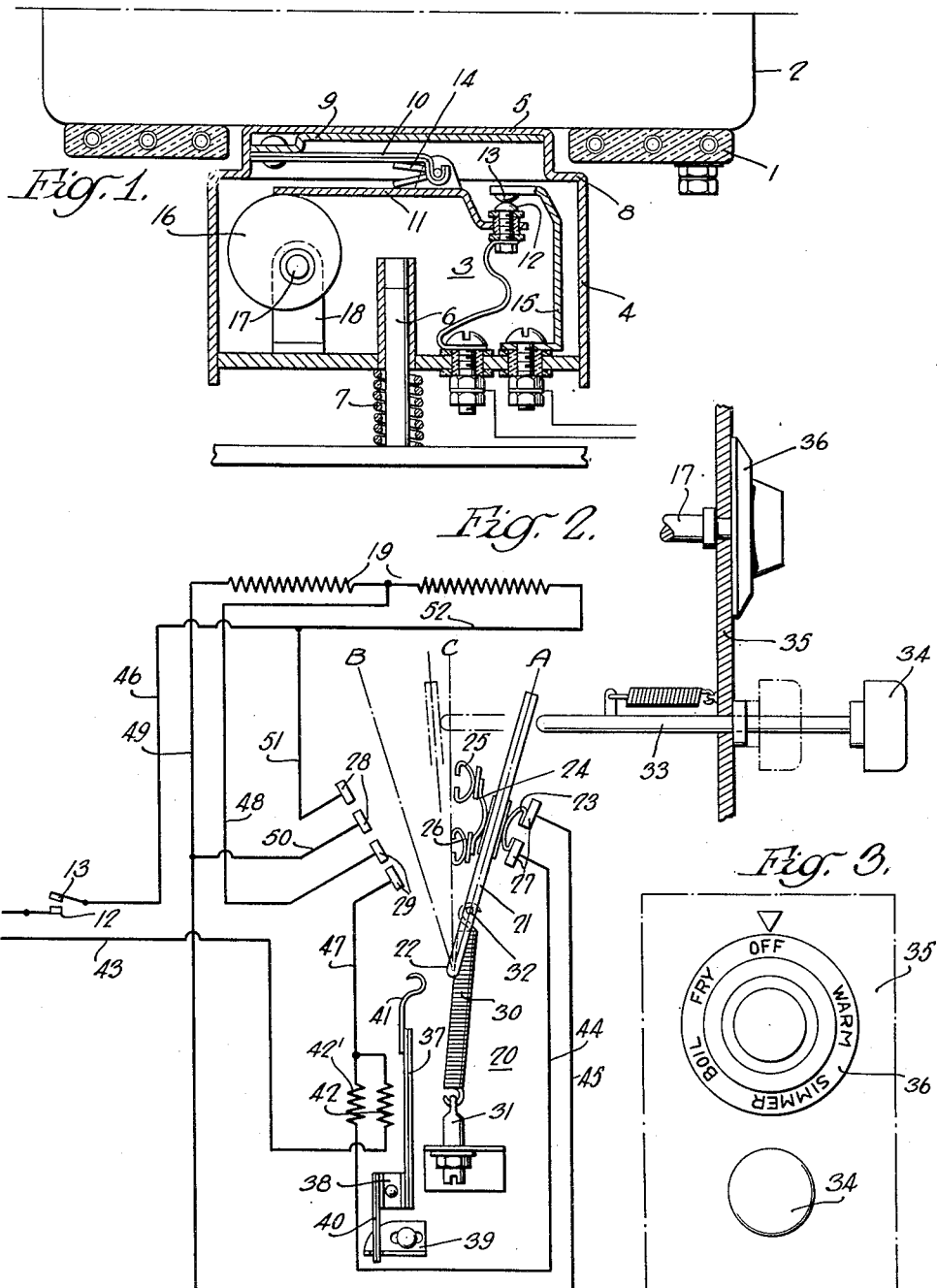
Inventors:—
Joseph W. Myers
Stephen J. Roesch
by their Attorneys
Howson & Howson July 9, 1940.   J. W. MYERS ET AL   2,207,634
CONTROL SYSTEM FOR ELECTRICAL HEATING UNITS
Filed Jan. 21, 1938   5 Sheets-Sheet 2
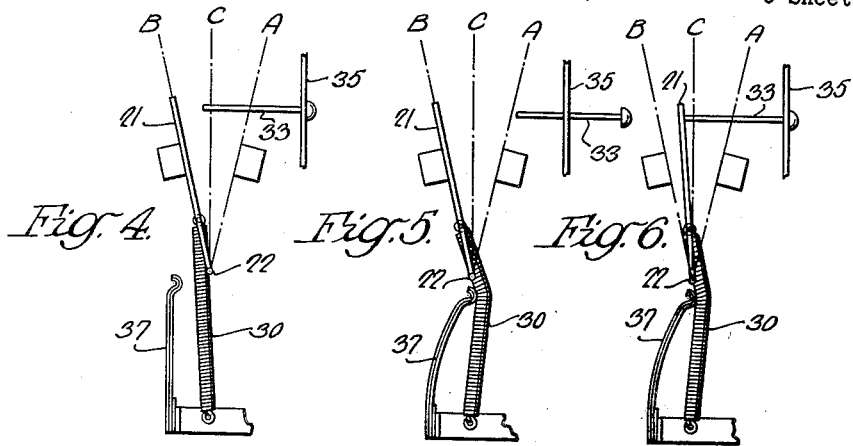
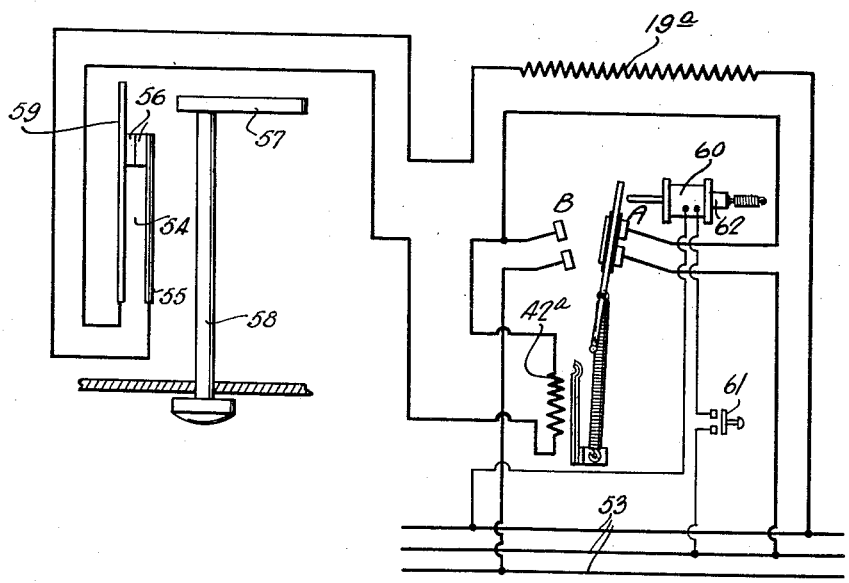
Inventors:—
Joseph W. Myers
Stephen J. Roesch
by their Attorneys
Howson & Howson Fig. 8.
Fig. 9.
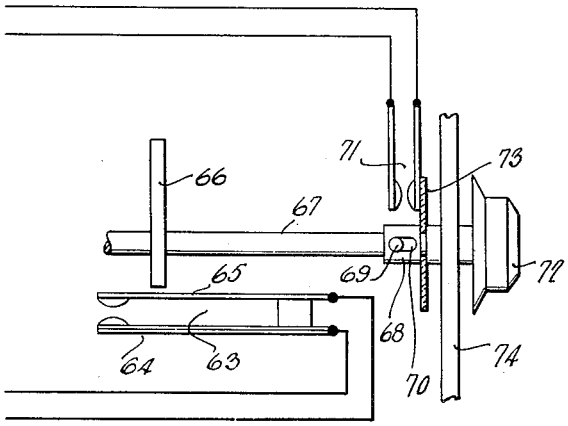
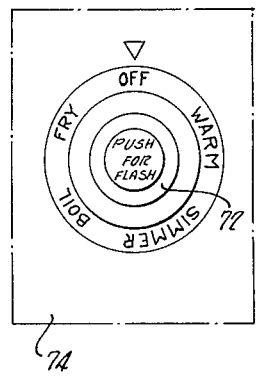
Fig. 10.
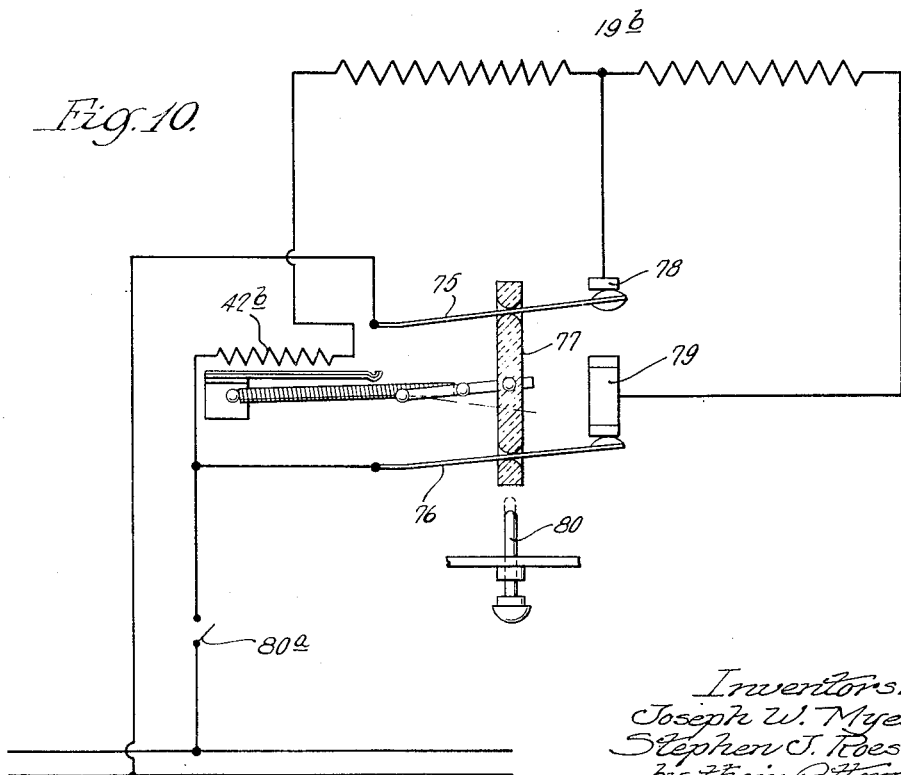

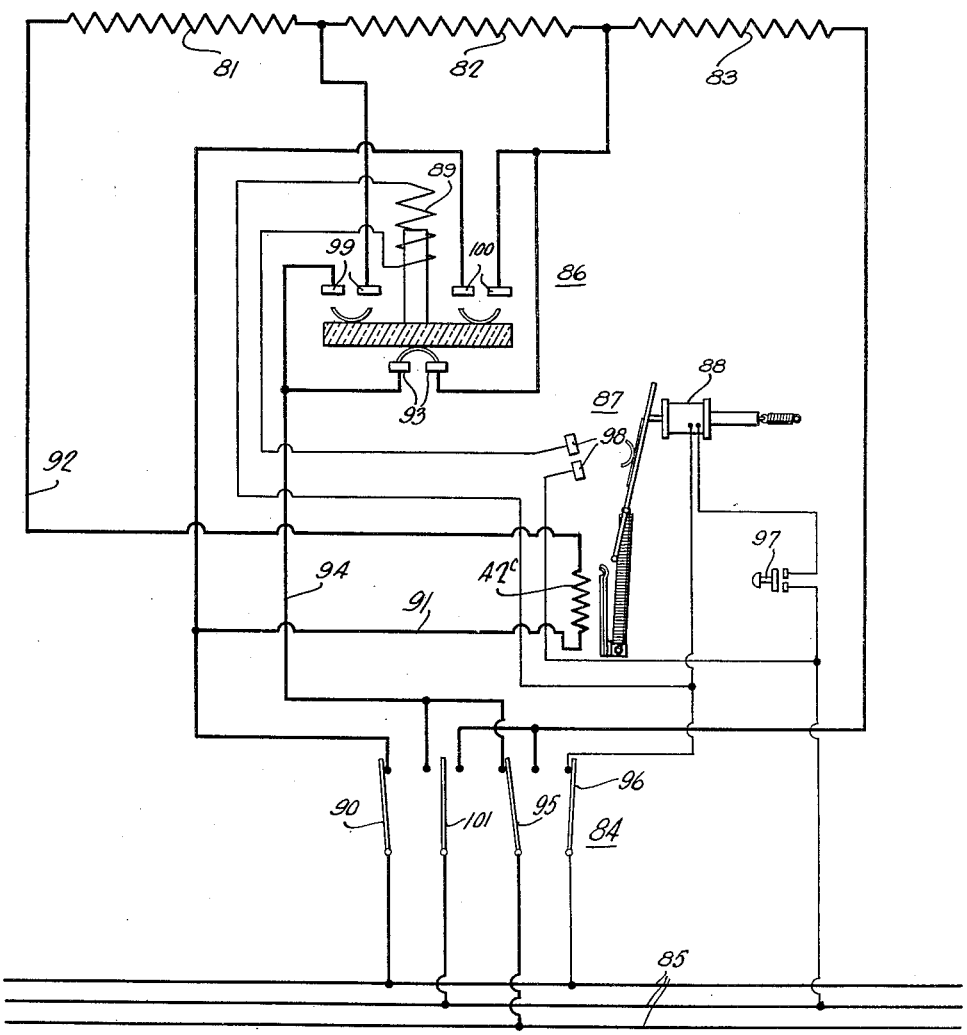
Fig. 11.
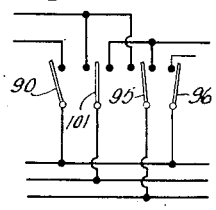 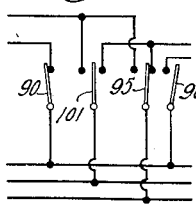 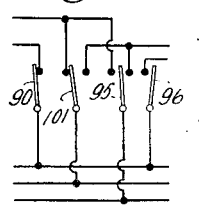 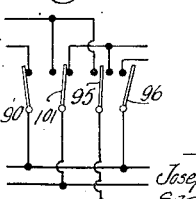
Fig. 12.  Fig. 13.  Fig. 14.  Fig. 15.

Patented July 9, 1940

2,207,634

UNITED STATES PATENT OFFICE 2,207,634

CONTROL SYSTEM FOR ELECTRICAL HEATING UNITS

Joseph W. Myers and Stephen J. Roesch, Philadelphia, Pa., assignors to Proctor & Schwartz, Incorporated, Philadelphia, Pa., a corporation of Pennsylvania Application January 21, 1938, Serial No. 186,222

23 Claims. (Cl. 219—20)

This invention relates to electric heating units, such as electric range cooking units, and more particularly to novel control means for effecting rapid heating of such units to a predetermined temperature level and for imparting to such units a high degree of flexibility of control and operation.

The use of electric ranges and other electrical devices employing surface cooking plates has been limited or retarded in the past by the fact that such devices require appreciable time to attain their normal operating temperature and heat output and in this respect are not comparable in operation to gas ranges. It is well known that electric ranges have certain definite advantages over gas ranges but such advantages have heretofore been generally outweighed by the inherent inability of electric range units to rise rapidly to their normal operating temperature. Moreover, electrical devices of this type which heretofore have been proposed or used have not had the degree of flexibility of operation that obtains in the gas range, and this is a further reason why gas ranges have been frequently employed in the past in preference to electric ranges.

It has been proposed heretofore to temporarily overload or increase the energization of an electrical surface cooking plate unit by temporarily lowering the resistance of the unit to the supply voltage, and it has been proposed to employ a thermostat directly associated with the plate so as to be effected by the temperature thereof and arranged to restore the resistance of the heating unit to its normal value when the device has arrived at its normal operating temperature. It has also been proposed to decrease the resistance of the heating unit either by providing a normally short-circuited portion of the unit which is rendered effective by the thermostat when the unit has reached its normal operating temperature, or by providing a multi-section heating unit and initially connecting the sections in parallel relation and arranging the thermostat to connect them in series relation when the unit has reached its normal operating temperature. While these proposals have been improvements over the ordinary range unit, they have fallen short of providing a practical and commercially satisfactory range unit or surface cooking plate.

Experimentation has shown clearly that it is difficult in practice to locate a sufficiently sensitive and rugged thermostat against the lower side of the heating unit and, at the same time, have it accessible for servicing and inspection and properly protected from inevitable spillage of food substances. Moreover, to be practical, an electrical range unit or surface cooking plate must have multiple heats for various levels of energy output and it must be possible to bring the heating unit to its maximum operating temperature and heat output not only from the cold condition but also from any of the lower operating levels, such as the low and medium heat levels. It is preferable also to arrange the control of the unit so that the unit may be "flashed" (temporarily over-energized) to its highest output level only at the option of the operator and, furthermore, the unit must be protected from overload currents when such currents would result in damage thereto.

The principal object of the present invention is to provide an improved control device for electric range units and the like which places such units on a parity with gas ranges in respect to quick heating to a desired operating temperature and which imparts to an electric range unit a desired high degree of flexibility of control by incorporating features which are not obtainable in gas ranges. By this invention, there is provided a device which enables "flashing" of an electric range unit at the will of the operator and which enables the unit to be brought quickly to a predetermined temperature from any lower temperature condition and, at the same time, protects the unit from unsafe operation.

Another object of the invention is to provide a novel control system of this character which employs novel thermal-responsive means for controlling the flashing operation. More particularly, the invention provides a novel device which responds to the amplitude and time duration of the currents supplied to the heating unit and which is designed from the history of the energization of the heating unit so as to control the flashing operation substantially in accordance with the temperature of the heating unit. Such device fully meets the requirements of a practical thermal control device for controlling the flashing of the heating unit. Moreover, the control device is so constructed and arranged that it positively prevents flashing of the heating unit when the unit is substantially at the said predetermined temperature.

The invention may be fully understood by reference to the accompanying drawings, in which Fig. 1 is a sectional view of one form of range unit with an associated "food control" thermostat;

Fig. 2 is a diagrammatic illustration of one form of a quick heating control device for the unit;

Fig. 3 is a face view of the control panel of the device;

Figs. 4 to 6 are diagrammatic illustrations of the action of the thermostatic switching mechanism;

Fig. 7 is a diagrammatic illustration of a modified form of the control device;

Fig. 8 is a diagrammatic illustration of a single knob control which may be employed;

Fig. 9 is a face view of the control panel of the same device;

Fig. 10 illustrates a simplified form of the control system;

Fig. 11 is an illustration of a further modification;

Figs. 12 to 15 illustrate various positions of the control switch of Fig. 11.

Figure 16:
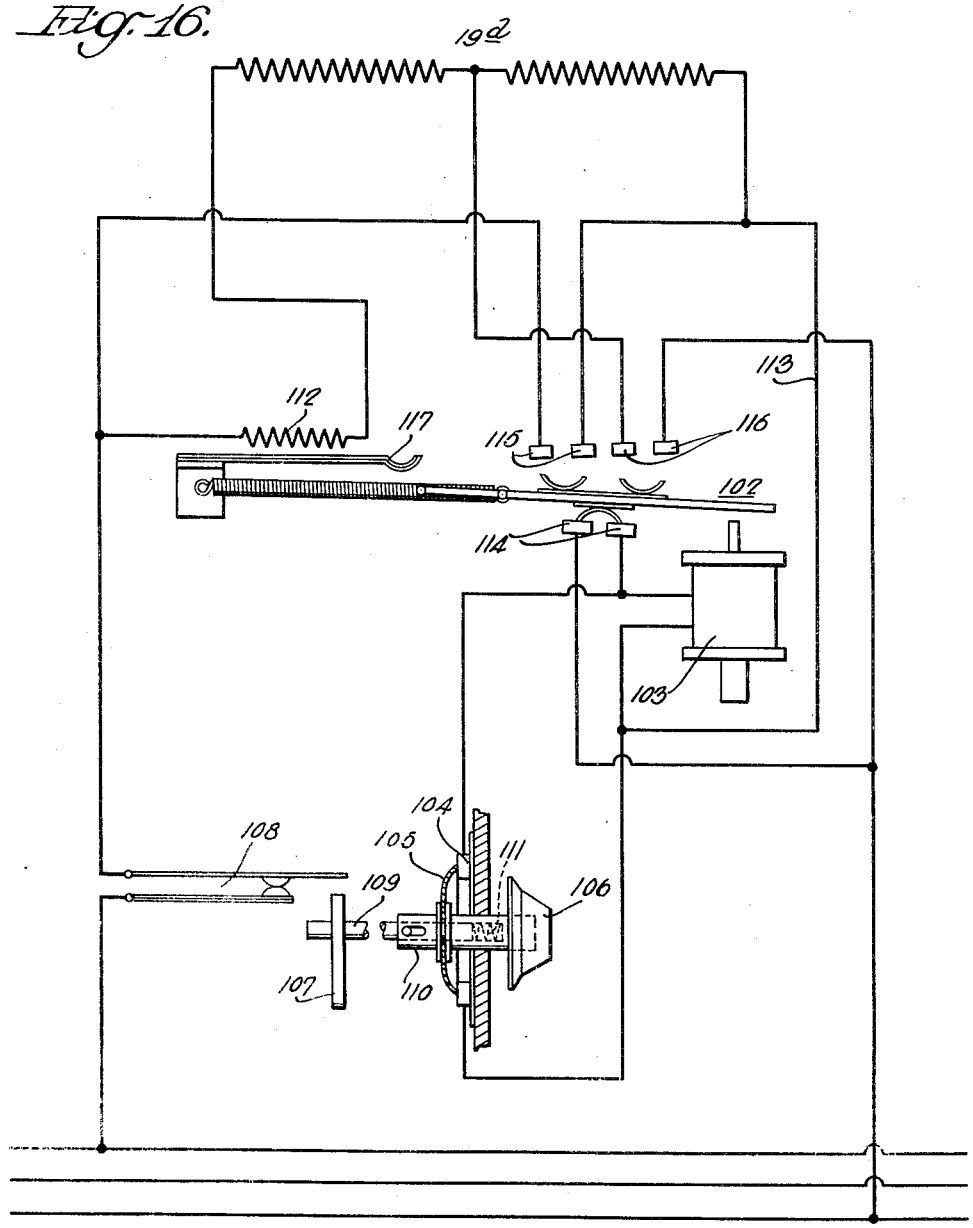
Fig. 16 illustrates a further modification.

Referring first to Fig. 1, there is shown one form of range unit which may be employed. In this device, the electric range unit 1 is adapted to support a cooking vessel such as indicated at 2. In cooperative relation with the annular unit 1, there is provided a thermostatic mechanism 3 of the character of that disclosed and claimed in the copending Myers and Roesch application Serial No. 54,341, filed December 13, 1935. The purpose of the mechanism 3 is to control the operation of the heating unit in response to the temperature of a cooking vessel placed thereon and to prevent overheating of the unit, and while this mechanism per se is not claimed herein, its use in combination with the control device described hereinafter is a part of the present invention and is claimed herein.

The mechanism 3 comprises a metallic casing 4, the upper portion 5 of which projects through the annular heating unit and is adapted to engage the bottom of a vessel placed on the heating unit, as illustrated. The device is slidably mounted upon one or more supports 6 and is seated upon a spring or springs 7 which urge it upward so as to maintain good contact with the cooking vessel. In the absence of the cooking vessel, the annular shoulder 8 of casing 4 abuts against the cooking plate so as to receive heat by direct thermal conduction therefrom. The purpose of this will appear presently.

Within the casing 4, there is provided a metallic supporting strip or plate 9 which is secured directly to the top 5 of the casing, and there is attached to the supporting strip 9 a thermostatic element 10 which is preferably composed of bimetallic material. It will be seen, therefore, that the thermostatic element receives heat by direct thermal conduction from the cooking vessel 2 and in the absence of the vessel, the thermostatic element receives heat by direct thermal conduction from the cooking plate 1 by virtue of the abutment of the shoulder 8 therewith. The thermostatic element 10 is secured at one end to the support 9, while at its other end it pivotally carries a contact lever 11 on one end of which there is mounted a contact 12 adapted to engage stationary contact 13. A spring 14 serves to urge the contact lever 11 in counter-clockwise direction as viewed in Fig. 1, thus urging the contact 12 into engagement with the contact 13. The latter contact is mounted upon a support 15 carried by the casing 4. The two contacts 12 and 13 form a switch which is included in circuit with the heating unit so as to control the same.

The other end of the contact lever 11 is engageable by a cam 16 carried by a rotatable shaft 17 which in turn is journaled in support 18. By rotating the cam 16, the switch 12, 13 may be opened manually or the cam may be variously positioned to adapt the mechanism 3 to maintain a desired temperature within the cooking vessel 2. Assuming a given setting of the cam 16 other than the "off" position, as the thermostatic element 10 responds to heat from the cooking vessel, as above described, it flexes downward carrying the contact lever 11 with it but, by virtue of the spring 14 and the pivotal mounting of the lever 11, the contacts 12 and 13 are maintained in engagement until the opposite end of lever 11 strikes the cam 16 which causes clockwise movement of arm 11 about its pivot point to open the switch contacts. Obviously, the temperature of the cooking vessel at which the switch contacts are opened will depend upon the setting of the cam 16. If there is no cooking vessel on the cooking plate, the thermostatic element will respond to the temperature of the cooking plate and will prevent it from rising above a certain temperature corresponding to the adjustment of cam 16. Thus, the mechanism 3 serves as a protective device to prevent the cooking plate from rising beyond a certain temperature, in addition to its function to control the operation of the unit in response to the temperature of the cooking vessel.

Referring now to Fig. 2, there is shown a multisection range unit 19 and a control mechanism designated generally by reference character 20 which is adapted to connect the sections of the heating unit 19 in parallel relation at the will of the operator to effect "flashing" of the unit to a high temperature or operating level from a lower temperature or operating level, to thus bring the unit rapidly to a desired operating level. The device 20, in the specific form illustrated, comprises a switch arm 21 which is pivotally mounted at one end as shown at 22. On one side, the arm 21 carries a resilient contact bridge 23, while on its other side, the arm carries a resilient support 24, which, in turn, carries resilient contact bridges 25 and 26. The arm 21 is adapted to move to either of two positions designated, respectively, A and B. Normally, the arm is disposed in its position A as illustrated, the contact bridge 23 engaging stationary contacts 27. When the arm is moved to position B, however, the contact bridge 25 engages stationary contacts 28, while the bridge 26 engages stationary contacts 29.

A spring 30 has its lower end attached to a stationary anchoring member 31 which is substantially aligned with the center position C through which the arm 21 moves during its movement from A to B or vice versa. The upper end of spring 30 is attached to arm 21 at 32. It will be seen, therefore, that the spring 30 normally maintains the arm 21 in the position A, as shown, but it will also be seen that if the arm 21 is moved from either of its positions to just beyond the center position C, the spring 30 will forcibly move the arm to the other position. There is thus provided a toggle switch arrangement which may be moved with a snap action to either of its positions in the manner just mentioned.

A manually-operable spring-biased push-rod 33 carrying a push-button or knob 34 at the forward end thereof is arranged so as to permit movement of the arm 21 at the will of the operator from the position A to a position just beyond the center position, as shown by the broken-line illustration. The push-rod 33 extends through the control panel 35 which limits the inward movement of the push-rod so that it is possible to move it against the action of its spring only far enough to carry the arm 21 just beyond the center position. Except under a certain condition which will be discussed hereinafter, this movement of the arm 21 to a point just beyond its center position, will permit the spring 30 to move the arm forcibly to the position B as above mentioned. Preferably, the push-button 34 is arranged on the control panel, as shown in Fig. 3, just below the control knob 36 for the cam 16. As indicated on the face of the panel in Fig. 3, the control knob 36 will have, in addition to the "off" position, various positions for operation of the heating unit and vessel 2 at different temperatures or heats to perform different cooking operations.

In accordance with the present invention, the flashing of the heating unit is controlled in a novel manner by employing the currents supplied to the heating unit as a medium of control.

Adjacent the spring 30, there is provided a thermostatic element 37 which preferably takes the form of a bimetallic member. This thermostatic element is secured at its lower end to a pivotal support 38 to which there is also secured a compensating thermostatic element 40, the lower end of which is held by an adjustable member 39. The element 40 responds to the ambient temperature of the air and adjusts the element 37 accordingly. At its upper end, the thermostatic element 37 carries a finger 41 which is adapted to engage the spring 30 just below the pivot point of arm 21. Adjacent the thermostatic element 37 are provided heating elements 42 and 42' through which the current supplied to the heating unit flows, thus causing the thermostatic element to respond to the magnitude and time duration of the current. When it is cold, the thermostatic element 37 assumes a substantially vertical position but, as it responds to heat from the heating elements 42 and 42', it flexes toward the right and at any given instant will assume some position to the right of its normal vertical position.

It has been found that a heating unit may be satisfactorily controlled by means of a device such as that shown and above described, by properly designing the thermostatic device in relation to the energization "history" of the heating unit. To explain this, it will be apparent that for a given amplitude of energizing current, the temperature of the heating unit will vary in relation to the time duration of the current according to the temperature characteristic of the unit. That is to say, if the temperature of the unit is plotted against time, a certain temperature curve will be obtained. Now in accordance with the present invention, the thermostatic device is designed from the energization "history" of the unit so that the thermo-motive element 37 substantially "tracks" with the temperature of the heating unit. In other words, for a given current amplitude, the position of element 37 varies in relation to the time duration of the current. At any instant, therefore, the position of the element 37 is determined by the energization history of the heating unit 19 over a significant period immediately preceding. Now the flashing operation is governed by the position of the element 37, or by the amplitude of movement of the said element, in any particular instance, as described hereinafter, and therefore, the flashing operation is empirically regulated according to the energization history of the heating unit over a significant period immediately preceding.

The proper design of the thermostatic device necessarily depends upon various factors, such as the mass of the heating unit with which the device is to be used, the thermal mass of the thermostatic element to be employed, and the activity of the element. In any case, the heating unit should have as low a mass as possible so that it may be heated rapidly during the flashing operation. Generally speaking, heating units of the type employing highly compressed insulating material completely embedding the wires are satisfactory for the purposes of the invention. For example, the well known tubular "Calrod" heating unit, which is commonly employed in electric ranges, is quite satisfactory. Such unit is capable of being flashed to its normal operating temperature level in thirty seconds.

One form of the thermostatic device which has been found to be satisfactory comprises a bimetallic strip with the heater element wound about the strip and covered with heat-insulating material, such as sheet asbestos. In general, given a satisfactory heating unit, a switch, and a bimetallic strip strong enough to operate the switch, the thermostatic device may be designed in a simple manner as follows. A sufficient number of turns of wire, comprising the heater element, are wound upon the bimetallic strip to cause it to open the switch when the heating unit has attained the desired temperature level. Sufficient heat-insulating material is then placed about the heater element to cause the bimetallic strip to cool at a rate comparable to the cooling rate of the heating unit, or in other words, to cause the strip to substantially track with the temperature of the heating unit. Thus, in general, the design may be reduced to the selection of the proper number of turns in the heater element and the proper amount of heat-insulating material.

The above simple method of designing the thermostatic device applies where a single heater element is employed, as in the devices described hereinafter. In Fig. 2, however, two heaters are employed, both being connected in circuit in series relation during normal operation and the heater 42 alone being connected in circuit during the flashing operation. In such case the heater 42 should have sufficient turns to effect opening of the switch, under the influence of the flashing current, when the heating unit attains the desired temperature level. Then the heater 42' may be made up of a number of turns sufficient to maintain the arm 37 in proper position corresponding to the temperature of the heating unit under the influence of the normal current through both heaters in series. Heater 42 should be of relatively heavy resistance wire to withstand large currents and heat output during flashing, while heater 42' should be of higher resistance since it only carries "normal" currents during regular operation of the range unit 19.

While the use of two heaters, as disclosed in Fig. 2, makes the design of the thermostatic device flexible, a single heater may be employed as disclosed in the later figures.

By employing a thermostatic device of this character, several important advantages are obtained. The device may be located remotely with respect to the heating unit in any suitable position where it will be protected from grease or spillage from the cooking vessels or pans and where it is conveniently located for servicing and inspection. Moreover, the employment of such thermostatic device in combination with the specific switch employed provides a control device which not only automatically controls the duration of the flashing operation, but also prevents flashing, whether wilful or accidental, when the heating unit is already at or near its maximum permissible temperature, as described more fully later. Thus, the device protects the heating unit from damage due to excessive overheating.

Considering now the specific operation of the device 20, and assuming that the device is operated from the cold condition with the switch arm 21 in the position A, as shown in Fig. 2, a circuit for the heating unit 19 is completed from conductor 43 through the heating elements 42 and 42', conductor 44, contacts 27 and the contact bridge 23, conductor 45, the sections of the heating unit 19 in series, conductor 46, and the switch contacts 12, 13 of the control mechanism 3. If now the push-rod 33 is actuated, as above described, to cause movement of the arm 21 by the spring 30 from the position A to the position B, as shown in Fig. 4, the sections of the heating unit 19 will be connected in parallel relation through a circuit which includes the conductor 43, heating element 42, conductor 47, contacts 29 and their contact bridge 26, conductor 48, the sections of the heating unit 19 in parallel (one parallel branch includes the left hand section, the conductor 49, conductor 50, closed contacts 28, and conductor 51, while the other parallel branch includes the right hand section of the heating unit and the conductor 52) the conductor 46, and the switch contacts 12, 13. The parallel connection of the heating unit sections increases the energization of the unit temporarily or, in other words, causes "flashing" of the unit as above described. When the thermostatic element 37 responds sufficiently to the current flow through the heating element 42, it deflects the spring 30, as shown in Fig. 5, exerting a pull upon the arm 21 and causing the same to move from the position B to position A with a snap.

Thus, the thermostatic element 37 restores the normal energization of the heating unit when the unit has presumably attained a predetermined temperature which is a function of the magnitude of the current flowing to the unit and the time duration of such current. It will be noted that the thermostatic switch 12, 13 of the control mechanism 3 is at all times included in the circuit of the heating unit and prevents the unit from rising dangerously above the temperature for which the control mechanism 3 is adjusted. Thus, the mechanism 3 protects the unit and prevents "flashing" if the unit has not been giving off its heat in a normal manner. This might occur, for example, if the cooking vessel on the heating unit has boiled dry.

The thermostatic element 37, in addition to serving as a means to restore the energization of the unit to normal as above described, determines the period during which the heating unit is over-energized or "flashed", and also prevents "flashing" of the unit if the temperature of the unit is substantially at the maximum permissible temperature thereof. To explain this more fully, suppose that the thermostatic element is at some intermediate position within its range of movement when the heating unit is "flashed." Such intermediate position of the element 37 will, of course, be due to previous heating of the heating unit and it is, therefore, unnecessary and undesirable to flash the unit for as long a period as in the case where the unit is flashed from cold condition. Obviously, it will not require as long a time for the element 37 to engage the spring 30 and return the arm 21 to the position A under such circumstances as the time required when the heating unit is flashed from the cold condition. It will be obvious also that the actual time during which the unit is flashed will depend upon the instant position of the element 37 at the time of flashing. Thus, this element controls the flashing of the unit in dependence upon the immediately preceding significant energization history of the unit at the time that it is flashed, which is in practical, if not always exact, agreement with the temperature of the unit.

Should the element 37 be in its extreme right hand position at the time that it is attempted to flash the unit, it will prevent the unit from being flashed since, while the arm 21 may be moved to a point beyond the center position, the finger 41 engaging the spring 30 prevents the spring from snapping the arm to the position B, as may be seen from Fig. 6. Thus the thermostatic element 37 positively prevents the heating unit from being flashed when the temperature of the unit is substantially at maximum permissible temperature.

From the above description, it will be seen that the device illustrated in Figs. 1 to 3 enables operation of an electric range unit to maintain any one of several cooking temperatures which may be selected at will by the operator through the medium of the control knob 36, and it will also be seen that the operator may cause the unit to heat rapidly to the highest permissible temperature by flashing the unit at will through the medium of the push-button 34. The unit may be flashed when it is operating at any temperature other than its highest permissible temperature. It might appear offhand that low and intermediate settings of control device 3 would interfere with flashing of the unit to the higher temperature level, but the device 3 is relatively slow-acting and does not take over control of the unit until the flashing operation is completed.

In Fig. 7, there is shown a modified form of the device in which a plurality of operating voltages are employed and in which the flashing of the electrical heating unit is effected by applying a greater voltage thereto than that normally supplied to the unit, and in which the flashing operation is controlled electrically employing a mechanism generally similar to the mechanism 20 of Fig. 2. In this instance, a simple heating unit 19a is provided and is energized from the three-wire supply system 53, which may supply voltages of 115 and 230. The flasher mechanism is simplified in that it requires only two stationary contacts in the flash position B. The thermostatic switch 54 corresponds to the thermostatic switch of the mechanism 3 of Fig. 1 and comprises a bimetallic thermostatic element 55 which flexes in response to heat received directly from the cooking vessel or the heating unit, as illustrated and described in connection with Fig. 1, to open the switch contacts 56. The cam 57, whose position is controlled by the manually-rotatable shaft 58, is adapted to open the switch contacts 56 and also to adjust the stationary contact arm 59 to vary the temperature level at which it is desired to operate the heating unit 19a.

In this instance, a solenoid 60 is employed to initiate flashing of the unit. It will be seen that normally the heating unit is energized through a circuit extending from the uppermost supply line to the intermediate supply line, which circuit may be readily traced through the heating unit, the thermostatic switch 54, the heating element 42a, and the closed contacts of the flasher switch in the position A. When the switch 61 is closed, however, the armature of the solenoid moves the switch arm to just beyond the vertical, permitting the spring to throw the flasher switch to position B. The heating unit is then energized through a circuit which extends from the uppermost supply line to the lowermost supply line, through the B contacts of the flasher switch, as may be readily traced. The spring biased armature 62 of the solenoid is returned to normal position as soon as the push-button switch 61 is opened. It should be noted that in this instance, the stroke of the solenoid armature is only sufficient to move the switch arm to just beyond the vertical, so that the thermostat determines whether the flashing takes place, as above described.

In Figs. 8 and 9, there is illustrated a simple control device which may be employed in any instance where a thermostatic switch is used and where it is desired to effect flashing of the heating unit by means of a solenoid or the like. For example, this device could be employed in the system of Fig. 7. Referring to Fig. 8, there is shown a thermostatic switch 63 comprising a thermostatic element 64 constituting one switch arm and a switch arm 65 whose position is adjustable by means of the cam 66 mounted on the rotatable shaft 67. This thermostatic switch mechanism may take the form of the mechanism 3 of Fig. 1 or any other suitable form.

A sleeve 68 is attached to the shaft 67 but is movable longitudinally relative to the shaft. To this end, there is provided a pin 69 on the shaft 67, which pin is slidably seated in a slot 70 in the sleeve. It will be seen, therefore, that rotation of the sleeve will cause rotation of the shaft, while at the same time, the sleeve may be moved axially by virtue of the pin and slot connection. The axial movement of the sleeve controls a switch 71 which may be employed to control the energization of a solenoid for effecting the flashing of the heating unit. For example, in the system of Fig. 7, the switch 71 of Fig. 8 could be employed instead of the manual push-button switch 61 shown in Fig. 7. Normally, the sleeve 68 of Fig. 8 will be in its outermost position shown and suitable means, such as a spring may be employed to maintain it in that position. When the sleeve is pushed inward, however, by pressing on the control knob 72, the contacts of switch 71 are closed to effect flashing of the heating unit as above mentioned. Thus, by means of the single control knob 72, the thermostatic switch 63 may be adjusted by rotating the knob and the flashing operation may be effected by pressing the knob inward. In the simple structure illustrated, the sleeve 68 carries a collar or flange 73 which engages and moves one of the contacts of switch 71 when the knob 72 is pressed.

The control panel of this simplified control device is shown in Fig. 9. As illustrated, the various rotary positions of the knob 72 may be indicated on the control panel 74 by means of legends indicating various cooking functions. The face of the knob 72 may also bear a suitable legend, indicating that the knob is to be pushed inward to effect flashing of the heating unit.

In Fig. 10, there is illustrated a simplified form of a manually-operable flashing control system which is adapted to connect the sections of a multi-section heating unit in parallel relation to effect the flashing. This simplified device is unique in that it employs a minimum number of switch contacts in the flashing mechanism. The switching mechanism comprises two movable arms 75 and 76 which are adapted for tadem operation by virtue of the insulating bar 77 interconnecting them. The contacts carried by these arms cooperate with the stationary contact members 78 and 79. It will be noted that one extremity of the multi-section heating element 19b is connected to the contact member 79, while the mid point or common terminal element of the heating sections is connected to the contact member 78. The switching mechanism is shown in its flash position to which it is movable by means of the manual push rod 80 which is adapted to engage an end of the bar 77. This snap-over switch mechanism is generally similar to that previously described and operates in the same manner.

In the flash position of the switch mechanism as illustrated, the sections of the heating unit are connected in parallel relation across the supply conductors, as may be readily traced. It will be noted that one of the branch circuits, including the left hand section of the heating unit, includes the heater element 42b. When the snap-over switch mechanism is in its normal position, the arm 75 engages contact member 79, while the arm 76 is free. In such case, the sections of the heating unit are connected in series relation across the supply conductors as may be readily seen, the heater element 42b being included in the series circuit.

As stated above, this simple control device is designed so that it requires a minimum number of contact elements in the snap-over switch mechanism. Such conventional and prior switching devices as might be employed in this simple control system would require a considerably greater number of contact elements and, in general, it has been found that almost twice as many contact elements would be necessary if such prior devices were to be employed. The novel switch construction and arrangement of Fig. 10, therefore, effects a substantial economy and greatly simplifies the control system.

Where the flashing operation is effected by connecting a plurality of heating unit sections in parallel relation and where a single heater element is employed in the thermostatic control device, as in the system of Fig. 10, the location of the heater element in the circuit is impotrant. By arranging the heater element 42b so that it is normally in series with the heating unit and so that it is included in one of the branch circuits during the flashing operation, the wattage consumption of the heater element is caused to vary in the same ratio as the wattage consumption of the heating unit. This is essential to the design of the thermostatic control device in order that that device may "keep in step" or "track" with the heating unit temperature.

Thus, assuming that the heating unit sections are of equal resistance, when the sections are connected in parallel relation the total current supplied to the heating unit is four times that supplied to the unit when the sections are connected in series. Now if the heater 42b were connected in series with the parallel-connected heating unit sections, the heater would receive four times the normal current and would consume sixteen times its normal wattage, while the heating unit consumes only four times its normal wattage. However, since the heater 42b is included in one of the branch circuits of the parallel-connected heating unit sections, it receives only twice the normal current during the flashing operation, and therefore its wattage consumption increases in the same ratio as that of the heating unit. It will be apparent then that this is an important feature.

Of course, if it is desired to use two heaters, they may be arranged as illustrated in Fig. 2, one heater being used for flash and the other for normal operation.

The switch 80a corresponds to the thermostatic control switch 3 of Fig. 1 and may take any suitable form such as above described.

In Figs. 11 to 15, there is illustrated a further modified form of the control system, in which the thermally independent multi-section heating unit 19c is adapted to be operated at various energy levels by different connections of the heating unit sections and by the employment of different operating voltages. It will be noted that the heating unit comprises two main sections 81 and 82 and an auxiliary section 83 which may be of lower capacity than the main sections. By means of the arrangement shown, the multi-section heating unit may be operated at different temperature levels which may be designated, respectively, "high," "medium," "low," and "sub-low." The extremely low temperature level designated by the term "sub-low" is obtained by the use of the auxiliary section 83 and the switching arrangement now to be described.

The adjustment of the control system for operation of the heating unit at the different temperature levels is controlled by means of a manual control switch 84 which comprises a plurality of movable contact arms adapted to engage various stationary contacts as illustrated. This control switch has five positions which are shown respectively in Figs. 11 to 15; that is to say, the positions of the contact arms of the switch for the different adjustment positions of the switch are shown in these figures. The specific switch structure by which the contact arms are moved to their various positions during manual adjustment of the switch is relatively unimportant since any suitable conventional structure may be employed. For example, the contact arms may be moved by means of cams mounted on a common rotatable shaft, the cams being so designed that the contact arms will be in the positions illustrated in the several figures when the shaft is rotated to any one of the control positions. It is deemed unnecessary, therefore, to illustrate the mechanical details of the control switch.

In this device, a three-wire supply line 85 is employed and it may be assumed that the voltage between adjacent supply conductors is 115 volts, while the voltage across the two outer supply conductors is 230 volts. These different voltages are utilized in conjunction with the multi-section heating unit to obtain different temperature levels and also to effect flashing of the heating unit.

It should be noted also that in this instance, the actual switching of the heating unit sections is performed by a contactor 86 which is controlled by a snap-over switch 87 generally similar to that above described. The switch 87 is operated by a solenoid 88 and serves to control the energization of the contactor coil 89. Thus the snap-over switch 87 serves as a control relay rather than as a switching device for the heating unit sections.

When the control switch 84 is in its "high" position, the switch contacts will be in the positions shown in Fig. 11. Since the contactor 86 and the snap-over switch 87 will normally be in the positions shown, during normal "high" operation of the heating unit, the sections 81 and 82 are connected in series relation across the two outer supply conductors. The energizing circuit may be traced through contact 90, conductor 91, heater element 42c, conductor 92, heating unit sections 81 and 82, the closed contactor contacts 93, conductor 94 and contact 95. In this position of the control switch 84, the contact arm 96 is closed, adapting the system for flashing the heating unit at will. It may be noted here that the switch arm 96 is open in all other positions of the control switch, as may be seen in Figs. 12 to 15 so that the heating unit may be flashed only when the control switch is in the "high" position. In order to flash the unit, the operator presses the push-button switch 97, thereby energizing solenoid 88 and causing the switch 87 to close. It will be apparent that the closing of the contacts 98 will close the energizing circuit of the contactor coil 89, thus opening contacts 93 and closing contacts 99 and 100. This connects the main sections 81 and 82 of the heating unit in parallel relation across the outer supply conductors, thus increasing the energization of the heating unit above normal. When the heating unit reaches its maximum permissible temperature, the snap-over switch 87 is calculated to be opened by its thermostatic element, as will be clearly understood from the above description. If the switch 84 is moved during the flashing operation to a position other than high, the flashing operation is interrupted and normal series connection of the heating unit sections is restored by the de-energization of contactor 86.

Fig. 12 shows the positions of the contact arms of the control switch 84 when the switch is in the "off" position. It will be noted that in this position, all of the switch contacts are open.

Fig. 13 shows the positions of the switch contacts for the "medium" operation level. As will be clearly apparent from Figs. 11 and 13, in this position of the control switch, all three of the heating unit sections are connected in series across the two outer supply conductors. Thus, compared to "high" operation, the medium operation inserts the auxiliary section 83 in circuit, thus increasing the resistance of the heating unit and, consequently, reducing the current flowing through the unit.

Fig. 14 shows the positions of the control switch contacts in the "low" position of the switch. In this instance, the main sections 81 and 82 are connected in series across the two uppermost supply conductors by virtue of the closure of contacts 101 and 90 and the opening of contact 95. Thus the sections 81 and 82 are serially connected across the lower voltage supply conductors.

Fig. 15 shows the positions of the control switch contacts in the "sub-low" position of the switch. In this instance all three of the heating unit sections are connected in series across the two uppermost supply conductors, thus applying the lower operating voltage to the entire heating unit.

Thus, there is provided a control system employing a multi-position switch which serves to control the temperature or operating level of the heating unit and which enables flashing of the heating unit only when the control switch is in its "high" position. It will be noted that only three of the contact arms of the control switch 84 are employed to effect different operating temperatures of the heating unit, the fourth contact arm 96 serving only to control the energizing circuit for the solenoid 88. By the novel arrangement shown and employing only three movable switch contacts, four different operating levels for the heating unit are provided.

It will be noted that the single heater element 42c is connected in series with the heating unit during all positions of the control switch 84 except during the flashing operation when the heater element is included in one of the parallel branch circuits. From the above description relative to Fig. 10, it will be seen that the wattage consumption of the heater element varies in the same ratio as that of the heating unit. As indicated above, this is an important feature.

In Fig. 16, there is illustrated a further form of the control system. In this instance, the multi-section heating unit 19d is controlled by the flashing mechanism 102 which is generally similar to the corresponding devices employed in the previously-described embodiments. The movable arm of the flashing device is actuated by solenoid 103 which is capable of moving the arm only to a position just beyond the center position, as will be understood from the above description. In this instance, however, the solenoid 103 is serially connected in circuit with the heating unit and, consequently, requires relatively few turns of heavy wire to carry the heating currents, rather than the relatively large number of turns of fine wire required in the solenoids of the devices of Figs. 7 and 11. The design of this series solenoid is, therefore, relatively simple.

It will be noted that the solenoid 103 is normally short-circuited by the switch comprising stationary contacts 104 and contact disk 105. This switch is controlled by the manual control knob 106 which also controls the position of the cam 107 arranged cooperatively with the thermostatic switch 108. This thermostatic switch corresponds to those employed in the devices above described. The cam shaft 109 is connected by pin and slot connection to a sleeve 110 which carries the control knob 106. A spring 111 urges the sleeve and the control knob carried thereby outward, thus normally maintaining the switch 104, 105 closed. Normally, therefore, the sections of the heating unit are connected in series relation through a circuit which includes the thermostatic switch 108, the heater 112, the heating unit sections in series, conductor 113, the closed switch 104, 105, and closed contacts 114.

When it is desired to flash the heating unit, the control knob 106 is pushed inward against the action of spring 111, thereby causing the disk 105 to leave the contacts 104, thus opening the short-circuit about the solenoid 103. The solenoid is, therefore, energized by the currents flowing to the heating unit and initiates the operation of the flashing device 102. Of course, the contacts 114 are opened when the arm of the flashing device is actuated by the solenoid, so that the solenoid is denergized, but the "kick" of the solenoid armature caused by the momentary energization of the solenoid is sufficient to initiate operation of the flashing mechanism. With the arm in its upper position, the heating unit sections are connected in parallel relation by virtue of the closing of contacts 115 and 116 as may be readily traced. When the thermostat 117 returns the arm of the flashing device to normal position, the parts are again in the positions shown.

It will be noted that the single heater element 112 is included in one of the branch circuits during the parallel connection of the heating unit sections while the flashing operation is in progress. This is important, as will be appreciated from the above discussion.

As illustrated by the embodiments above described, the invention provides for the flashing or over-energization of a heating unit of relatively high energy-consuming capacity and having a normal high operating temperature, under the control of a current-operated thermostatic device of relatively low energy-consuming capacity constructed and arranged to heat and cool proportionately to the heating and cooling of the said unit, so that the thermostatic device keeps in step or "tracks" with the heating unit.

While several different forms of the invention have been illustrated and described, it will be apparent that further embodiments of the invention are possible and will occur to persons skilled in the art. Hence the invention is not limited by the present disclosure but only by the scope of the appended claims.

We claim:

1. In an electrical cooking apparatus, an electrical heating unit of relatively high energy-consuming capacity and having a normal high operating temperature, electrical connections for effecting normal energization of said unit, other electrical connections for effecting abnormal energization of said unit to cause rapid heating of the unit to said temperature, a switch arranged to control said connections and thus control the abnormal energization of said unit, and a thermostatic control device for actuating said switch, said control device comprising a heater element of relatively low energy-consuming capacity continuously in circuit with said heating unit and arranged to receive at all times an amount of energy that is proportional to the energy supplied to the unit, and an associated thermomotive element responsive to the heat from said element and arranged to effect actuation of said switch, said control device being constructed and arranged to heat and cool proportionately to the heating and cooling of said heating unit, to thus control the abnormal energization of said unit according to the energization history of the heating unit.

2. In an electrical cooking apparatus, an electrical heating unit of relatively high energy-consuming capacity and having a normal heating range extending to a normal high operating temperature, electrical connections for effecting normal energization of said unit, other electrical connections for effecting abnormal energization of said unit to cause rapid heating of the unit to said temperature, a switch arranged to control said connections and thus control the abnormal energization of said unit, and a thermostatic control device for actuating said switch, said control device comprising a heater element of relatively low energy-consuming capacity continuously in circuit with said heating unit, and arranged to receive at all times an amount of energy that is proportional to the energy supplied to the unit, and an associated thermomotive element responsive to the heat from said element and operating at a substantially lower temperature than said unit and arranged to effect actuation of said switch, said control device being constructed and arranged to heat and cool over its operating range in the same time that the heating unit heats and cools over its operating range, to thus control the abnormal energization of said unit according to the energization history of the heating unit.

3. In an electrical heating device, an electric heating unit of relatively high energy-consuming capacity and operable at a high temperature, means for energizing said unit, manually controllable means for increasing the energization of said unit at will to above normal to effect rapid heating of said unit to said temperature, and current-controlled means for restoring the normal energization of said unit when the unit has been heated to said temperature, and for preventing increase of the energization of the unit to above normal when it is already heated substantially to said temperature, said last-named means comprising a current-heated thermomotive element of relatively low energy-consuming capacity constructed and arranged to receive at all times an amount of energy that is proportional to the energy supplied to said heating unit, and to cool at a rate proportional to the cooling rate of said unit, whereby said thermomotive element operates in tracking relation with said unit during both heating and cooling.

4. In an electrical heating device, a multi-section electric heating unit, means for connecting said sections in series relation to effect normal energization of said unit, means for connecting said sections in parallel relation to increase the energization of said unit to above normal to effect rapid heating action, whereby the wattage consumption of said unit is increased in a certain ratio, thermo-responsive means for restoring the normal energization of said unit when the unit has been heated to a substantially predetermined temperature, and a heater element for said thermo-responsive means arranged in circuit with said unit so that the said element is serially connected during normal energization of said unit and is included in a parallel branch circuit with one of said sections during increased energization of the unit, whereby the wattage consumption of said element varies in the same ratio as the wattage consumption of said unit.

5. In an electrical heating device, a multi-section electric heating unit, means for connecting said sections in series relation to effect normal energization of said unit, means for connecting said sections in parallel relation to increase the energization of said unit to above normal to effect rapid heating action, whereby the wattage consumption of said unit is increased in a certain ratio, a single thermo-responsive means for restoring the normal energization of said unit when the thermo-responsive means has been heated to a substantially predetermined temperature, and a heater element for said thermo-responsive means arranged so as to be in circuit with all of the heating unit sections during normal energization but in circuit with one section only of said multi-section unit during abnormal energization of the unit, whereby the wattage developed in said thermo-responsive means changes in the same ratio as the wattage consumption of said unit when abnormal energization of the unit is effected.

6. In an electrical heating device, a multi-section electric heating unit, means for connecting said sections in series relation to effect normal energization of said unit, means for connecting said sections in parallel relation to increase the energization of said unit to above normal to effect rapid heating action, whereby the wattage consumption of said unit is increased in a certain ratio, thermo-responsive means for restoring the normal energization of said unit when the thermo-responsive means has been heated to a substantially predetermined temperature, and a heater element for said thermo-responsive means arranged so as to be included in circuit with all of the heating unit sections during normal energization but in one branch only of the parallel circuit during abnormal energization of the unit, whereby the wattage developed in said thermo-responsive means changes in the same ratio as the wattage consumption of said unit when abnormal energization of the unit is effected, said thermo-responsive means and its associated heater element being constructed and arranged to heat and cool proportionately to the heating and cooling of said heating unit.

7. In an electrical cooking apparatus, a multi-section cooking unit, a pair of supply conductors for supplying electrical energy at a certain voltage to said unit, electrical connections for connecting the sections of said unit in series across said supply conductors to effect normal operation of said unit at a normal high temperature level, other electrical connections for connecting the sections of said unit in parallel across said supply conductors to greatly increase the energization of said unit and cause rapid heating of the unit, the said different modes of connection causing said unit to draw different wattages from said supply conductors, a two-position switch movable from a normal position to another position, contacts at the normal position of said switch for completing said first-mentioned connections, contacts at the other position of said switch for completing said rapid-heating connections, and current-operated thermostatic means for effecting automatic return of said switch to its normal position when said thermostatic element reaches substantially a predetermined temperature, said thermostatic means being arranged for energization from said supply conductors during both of the aforesaid modes of connection of the heating unit and arranged to receive different wattages corresponding respectively to the different wattages drawn by said unit during the different modes of connection thereof to said supply conductors, whereby said thermostatic means is electro-thermally conditioned in accurate correspondence to the electro-thermal conditioning of said unit during the different modes of connection of the unit.

8. In an electrical cooking apparatus, an electrical heating unit, means energizing said unit normally, means for increasing the energization of said unit to above normal to thereby effect rapid heating of the unit, means including a thermomotive element for restoring the normal energization of said unit when the thermomotive element has been heated substantially to a predetermined temperature, and a pair of heater elements having different resistance values arranged cooperatively with said thermomotive element to actuate the same, said heater elements being constructed and arranged so that one of them effects principal control of said thermomotive element during normal energization of said heating unit, while the other of said heater elements controls said thermomotive element during abnormal energization of said heating unit, the resistance value of said one element being such as to produce effective heating in response to the relatively low normal current, and the resistance value of said other element being such as to produce effective heating in response to the relatively high abnormal current.

9. In an electrical cooking apparatus, an electrical heating unit, means energizing said unit normally, means for increasing the energization of said unit to above normal to thereby effect rapid heating of the unit, means including a thermomotive element for restoring the normal energization of said unit when the thermomotive element has been heated substantially to a predetermined temperature, and a pair of heater elements, one of relatively high resistance and the other of relatively low resistance, arranged cooperatively with said thermomotive element to actuate the same, said heater elements being constructed and arranged so that both of them are included in circuit with said heating unit during normal energization thereof, and the low resistance element only is included in circuit with the heating unit during abnormal energization thereof, the high resistance element being capable of producing effective heating in response to the relatively low normal current, and the low resistance element being incapable of producing appreciable heating in response to such current but being capable of producing effective heating in response to the relatively high abnormal current.

10. In an electrically operated cooking apparatus, an electrical heating unit adapted to receive a cooking vessel, means for energizing said unit, a thermostatic control device engageable by the cooking vessel and including a thermostatic switch in circuit with said unit for controlling the normal energization of the unit in accordance with the temperature of said vessel, means for increasing the energization of said unit to above normal to effect rapid heating action of the unit, and control means remote from said unit for automatically controlling the period of abnormal energization of said unit.

11. In an electrically operated cooking apparatus, an electrical heating unit adapted to receive a cooking vessel, means for energizing said unit, a thermostatic control device resiliently mounted in cooperative relation with said heating unit and adapted to engage the unit in the absence of a cooking vessel thereon, so as to receive heat by thermal conduction from said unit, said control device being engageable by a cooking vessel placed on said unit and movable by the weight of the vessel away from said unit, so as to receive heat by thermal conduction from the vessel, said device including a thermostatic switch in circuit with said unit for controlling the energization of the unit in accordance with the temperature of said vessel, means for increasing the energization of said unit to above normal to effect rapid heating action thereof, and means physically independent of said control device for automatically controlling the period of abnormal energization of said unit.

12. In an electrical cooking apparatus, an electrical heating unit of relatively high energy-consuming capacity and having a normal high operating temperature, electrical connections for effecting normal energization of said unit, other electrical connections for effecting abnormal energization of said unit to cause rapid heating of the unit to said temperature, a switch arranged to control said connections and thus control the abnormal energization of said unit, a thermostatic control device for actuating said switch, said control device comprising a heater element of relatively low energy-consuming capacity continuously in circuit with said heating unit, and an associated thermomotive element responsive to the heat from said element and arranged to effect actuation of said switch, said control device being constructed and arranged to heat and cool proportionately to the heating and cooling of said heating unit, to thus control the abnormal energization of said unit according to the energization history of the heating unit, and a second thermostatic control device engageable by a cooking vessel placed on said unit, and including a thermostatic switch in circuit with said unit, for controlling the energization of the unit and for preventing the unit from rising above said normal temperature, thereby maintaining the proper relation between said unit and said first control device.

13. In an electrical cooking apparatus, an electrical heating unit of relatively high energy-consuming capacity and having a normal high operating temperature, electrical connections for effecting normal energization of said unit, other electrical connections for effecting abnormal energization of said unit to cause rapid heating of the unit to said temperature, a switch arranged to control said connections and thus control the abnormal energization of said unit, a thermostatic control device for actuating said switch, said control device comprising a heater element of relatively low energy-consuming capacity continuously in circuit with said heating unit, and an associated thermomotive element responsive to the heat from said element and arranged to effect actuation of said switch, said control device being constructed and arranged to heat and cool proportionately to the heating and cooling of said heating unit, to thus control the abnormal energization of said unit according to the energization history of the heating unit, a second thermostatic control device engageable by a cooking vessel placed on said unit, and including an adjustable thermostatic switch in circuit with said unit, for controlling the energization of the unit and for preventing the unit from rising above said normal temperature, thereby maintaining the proper relation between said unit and said first control device, and common control means for actuating said first-mentioned switch and for adjusting said last-mentioned switch.

14. In an electrical cooking apparatus, an electical heating unit of relatively high energy-consuming capacity and having a normal high operating temperature, electrical connections for effecting normal energization of said unit, other electrical connections for effecting abnormal energization of said unit to cause rapid heating of the unit to said temperature, a switch arranged to control said connections and thus control the abnormal energization of said unit, a thermostatic control device for actuating said switch, said control device comprising a heater element of relatively low energy-consuming capacity continuously in circuit with said heating unit, and an associated thermomotive element responsive to the heat from said element and arranged to effect actuation of said switch, said control device being constructed and arranged to heat and cool proportionately to the heating and cooling of said heating unit, to thus control the abnormal energization of said unit according to the energization history of the heating unit, a second thermostatic control device engageable by a cooking vessel placed on said unit, and including an adjustable thermostatic switch in circuit with said unit, for controlling the energization of the unit and for preventing the unit from rising above said normal temperature, thereby maintaining the proper relation between said unit and said first control device, and common control means for actuating said first-mentioned switch and for adjusting said last-mentioned switch, said last-mentioned means comprising a member movable rectilinearly to actuate said first-mentioned switch and rotatable to adjust said last-mentioned switch.

15. In an electrical cooking apparatus, an electrical heating unit, means for effecting normal energization of said unit, means including a switch for effecting abnormal energization of said unit, to thereby cause said unit to heat rapidly, means for automatically terminating the abnormal energization of said unit, a thermostatic control device engageable by a cooking vessel placed on said unit, and including an adjustable thermostatic switch in circuit with said unit, for controlling the energization of the unit and for preventing the unit from rising above its normal high temperature, and manual control means for actuating said first-mentioned switch at will and for adjusting said last-mentioned switch at will.

16. In an electrical cooking apparatus, an electrical heating unit, means for effecting normal energization of said unit, means including an adjustable thermostatic switch for operating said unit at a selected one of a plurality of temperature levels, means for increasing the energization of said unit to above normal to effect rapid heating thereof, common manual control means for adjusting said switch and for actuating said last-mentioned means at will, and means for automatically terminating the abnormal energization of said unit.

17. In an electrical heating device, an electric heating unit, circuit means for energizing said unit during normal operation thereof, circuit means for supplying greater-than-normal energy to said unit, switching means including a pivoted arm for rendering either of said circuit means effective selectively, said arm being movable between two effective positions through a center position, spring means arranged to move said arm to one or the other of its effective positions when the arm is at one side or the other side of its center position, means for moving said arm from the normal-energization position to just beyond the center position only, to thereby permit said spring means to move said arm to the greater-than-normal energization position, and means for moving said arm to the opposite side of its center position when said unit is heated to a predetermined temperature, to thereby cause said spring means to move the arm back to its normal-energization position.

18. In an electrical heating device, an electric heating unit, circuit means for energizing said unit during normal operation thereof, circuit means for supplying greater-than-normal energy to said unit, switching means including a pivoted arm for rendering either of said circuit means effective selectively, said arm being movable between two effective positions through a center position, spring means arranged to move said arm to one or the other of its effective positions when the arm is at one side or the other side of its center position, means for moving said arm from the normal-energization position to just beyond the center position only, to thereby cause said spring means to move said arm to the greater-than-normal energization position, and current-controlled means for deflecting said spring means when said unit is heated to a substantially predetermined temperature, to thereby cause said spring means to move the arm back to its normal-energization position, said deflecting means preventing movement of said arm to greater-than-normal energization position when said unit is already heated substantially to said temperature.

19. In an electrical heating device, an electric heating unit, circuit means for energizing said unit during normal operation thereof, circuit means for supplying greater-than-normal energy to said unit, means including an element movable from one position to a second position to interrupt said first circuit means and close said second circuit means, means tending to move said element abruptly to its second position only when the element is moved through a predetermined distance toward its second position, means for moving said element through said distance but incapable alone of moving the element to its second position, and thermomotive means constructed and arranged to engage said fourth-mentioned means and thus prevent movement of said element to its second position whenever the thermomotive means is heated substantially to a predetermined temperature.

20. In an electrical heating device, an electric heating unit, means for energizing said unit, means for increasing the energization of said unit to above normal to effect rapid heating action, current-operated thermostatic means including a thermomotive element remote from said heating unit for automatically controlling the period of abnormal energization of said unit and for restoring the normal energization of said unit when said thermomotive element reaches a predetermined position, and additional thermostatic means principally affected by the ambient air temperature for varying the instant position of said thermomotive element accordingly to alter the travel of said element required to restore normal energization of said heating unit.

21. In an electrical heating device, an electrical heating unit comprising a plurality of sections, a source of a plurality of voltages for energizing said unit, means including a multi-position switch for connecting different series combinations of said sections to said source to effect operation of said unit at different temperature levels, manual means operable only when said switch is in its "high" position for connecting at least some of said sections in parallel relation to increase the energization of said unit to above normal, and means for automatically restoring the series connection of said sections to restore the normal energization of said unit when it reaches a substantially predetermined temperature.

22. In an electrical heating device, an electrical heating unit, means for supplying predetermined energizing current to said unit to effect normal energization thereof, a control switch for said unit having an off position, means including a second switch for greatly increasing the energizing current to said heating unit, to thus effect rapid heating of the unit, manually-controllable means for actuating said second switch, means for automatically effecting return operation of said second switch to restore normal energization of said heating unit, and means for rendering said manually-controllable means inoperative whenever said control switch is in its off position, thus preventing actuation of said second switch during the off condition of said control switch.

23. In an electrical heating device, an electrical heating unit, means including a multi-position control device for operating said unit at any one of a plurality of temperature levels corresponding to the positions of said control device, said temperature levels including a normal high operating level corresponding to the "high" position of said control device, manual means operable only when said control device is in its "high" position for increasing the energization of said unit to above normal, and means for automatically restoring the normal energization of said unit when it reaches substantially the said high operating level.

JOSEPH W. MYERS.
STEPHEN J. ROESCH.